United States Patent [19]

Ise

[11] Patent Number: 4,495,965
[45] Date of Patent: Jan. 29, 1985

[54] FLOW REGULATING VALVE

[75] Inventor: Yoji Ise, Tokyo, Japan

[73] Assignee: Myotoku Ltd., Tokyo, Japan

[21] Appl. No.: 407,909

[22] Filed: Aug. 13, 1982

[30] Foreign Application Priority Data

Aug. 21, 1981 [JP] Japan .............................. 56-123866[U]

[51] Int. Cl.³ ............................................. F16K 11/10
[52] U.S. Cl. ................................... 137/599; 251/126; 251/340
[58] Field of Search ............... 251/340, 346, 347, 126, 251/354, 599; 137/599.2

[56] References Cited

U.S. PATENT DOCUMENTS

| 2,813,545 | 11/1957 | Garnik | 251/340 |
| 2,924,237 | 2/1960 | Ellis | 137/599.2 |
| 3,093,155 | 6/1963 | Dawes | 251/340 |
| 3,998,244 | 12/1976 | Bentley | 251/126 |

FOREIGN PATENT DOCUMENTS

| 680721 | 2/1964 | Canada | 251/340 |
| 716500 | 1/1942 | Fed. Rep. of Germany | 251/340 |
| 783740 | 7/1935 | France | 251/340 |

Primary Examiner—Alan Cohan
Attorney, Agent, or Firm—Robert E. Burns; Emmanuel J. Lobato; Bruce L. Adams

[57] ABSTRACT

A nut means engages with a thread formed on an outside surface of the cylindrical form valve body. A valve member having a flow restricting means such as needle valve device on one end is fitted slidably within the valve body and the same is connected to the nut means with an engaging member which is slidably fitted within a slit formed lengthwise on said threaded surface and engages with the valve member and the nut means.

Fluid flow in the valve body is regulated by moving said valve member by turning said nut means. Thus the flow regulating valve of very compact form and capable of making fine adjustment of the flow rate can be provided because the conventional valve stem which engages with the internal thread of the valve body and projecting out therefrom for regulating flow is not used, and the adjustment is made with the thread of comparatively large diameter. Such flow regulating valve can be used suitably for controlling piston speed of power cylinder by providing the check valve therein.

9 Claims, 4 Drawing Figures

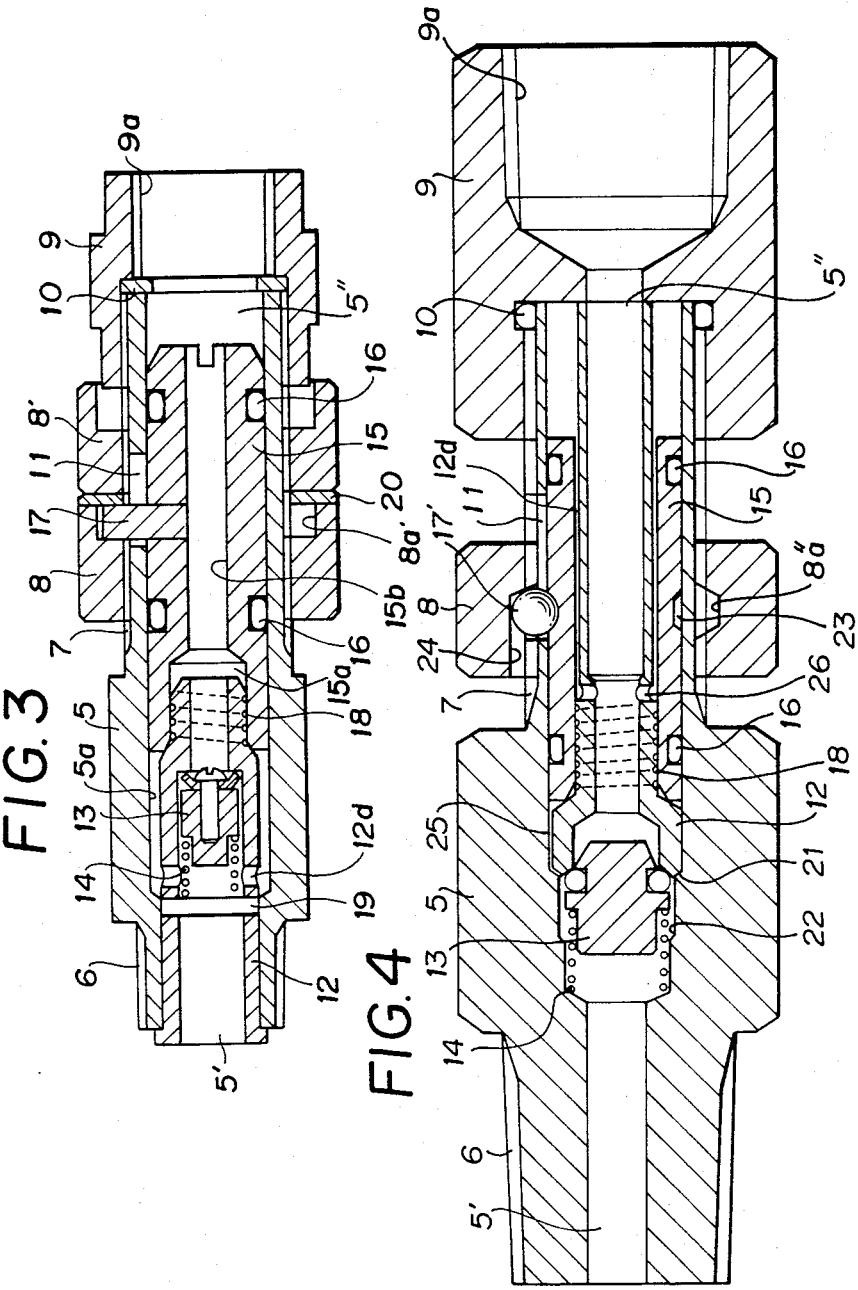

FLOW REGULATING VALVE

BACKGROUND OF THE INVENTION

This invention relates to flow regulating valves and also to those furnished with check valves therein and capable of regulating fluid flow in one direction and permitting free flow in the opposite direction, the latter can be used for controlling piston speed of hydraulic or pneumatic cylinders.

As illustrated in a schematic view in FIG. 1, two of such speed control valves 1 and 1' are generally connected to the opposite ends of cylinder 2 with each inlet port of controlled flow 1a and 1a' respectively, and each inlet port of free flow 1b and 1b' is connected to the source of the compressed air such as compressor 4 through a change valve 3.

When the compressed air is introduced to the right side control valve 1', the air flows into the right side chamber of the cylinder 2 freely through a check valve 1c' and pushes the piston 2' toward the left, and the air in the left side chamber is discharged through a regulating valve 1d of the left side control valve 1 and the change valve 3, so that the speed of the piston 2' can be controlled by the regulating valve 1d.

In the similar way, when the compressed air line is changed to the left side control valve 1 by shifting the change valve 3, the air flows into the left side chamber of the cylinder 2 freely through a check valve 1c, and pushes the piston 2' toward the right, and the speed of the piston 2' can be controlled by a regulating valve 1d'.

In the conventional flow regulating valves, the threaded portion of the valve stem engages with the threaded hole of the valve body and the handle portion of the stem is projecting out from the valve body, so that the shape of the valve is made complicated. Further, when the size of the valve is made small, the diameter of valve stem also becomes small, so that the fine adjustment of the flow may become difficult.

Recently, very small size of about several mm diameter power cylinders are required in the field of electronic industries, therefore in connection with this, small size speed control valves may be also required, but it is considered difficult to obtain such speed control valves with the ordinary valve construction, by the reason as mentioned above.

It is an object of this invention to provide a flow regulating valve of very compact form. Another object of this invention is to provide a flow regulating valve capable of fine adjustment of the flow rate even when the valve is made very small size.

SUMMARY OF THE INVENTION

A flow regulating valve of the present invention comprises a valve body of cylindrical form having ports on both ends, a thread formed on the outside surface thereof, and a slit formed lengthwise on said threaded surface and throughout the wall of said valve body; a nut means engaged with said thread on the surface of the valve body; and a valve member of cylindrical form slidably fitted within said valve body and providing a flow restricting means on one end thereof together with a part of said valve body; said valve member being connected to said nut means with an engaging member slidably fitted within said slit of the valve body and engaging with said valve member and nut means and adapted to move within said valve body and actuate said flow restricing means to adjust flow rate of the fluid flowing through said valve body, by turning said nut means.

Thus the flow regulating valve of very compact form, and capable of making fine adjustment of the flow rate may be provided according to the present invention, because the nut engaged with the outside surface of the valve body is used for the adjustment instead of the conventional valve stem which is projecting out from the body, and the adjustment is made with the thread of comparatively large diameter.

In one embodiment of the present invention, an engaging pin is used for the engaging member, said engaging pin is secured to the valve member at one end and engages with the nut means at the other end. In the other embodiment, a ball is used for the engaging member, the same engages with grooves formed on the outside surface of the valve member and the inside surface of the nut means.

Conventional needle valve device or other devices may be used for the flow restricting means. Further, the flow regulating valve of the present invention may be furnished with check valves, and can be used for controlling piston speed of the power cylinder.

BRIEF DESCRIPTION OF THE DRAWINGS

FIGS. 3 and 4 are cross-sectional views of other embodiments of the flow regulating valves according to the present invention.

DESCRIPTION OF THE PREFERRED EMBODIMENT

Figure 1:
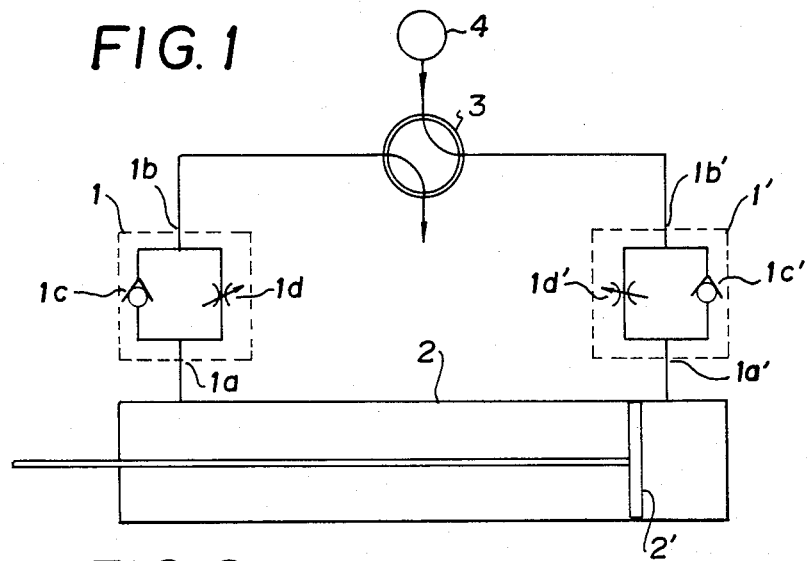
FIG. 1 is a schematic view illustrating an arrangement of the flow regulating valves used for controlling piston speed of the power cylinder.
Figure 2:
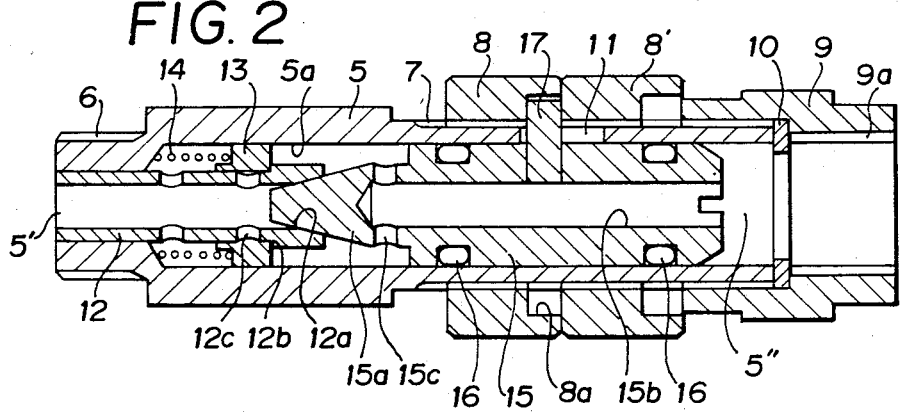
FIG. 2 is a cross-sectional view of an embodiment of the flow regulating valve according to the present invention.

A flow regulating valve shown in FIG. 2 includes a valve body 5 of cylindrical form having a valve chamber 5a and ports 5' and 5" on both ends thereof. A thread 6 for connecting the valve body to the pipe-line is provided on the left end outside surface, and a thread 7 is provided on the right outside surface and adjusting nuts 8 and 8' are engaged therewith. A slit 11 is formed lengthwise on the suitable portion of the threaded surface 7 and throughout the wall of the valve body 5, and on the right end of the thread 7, a connecting head 9 having internal thread 9a, on the open end is engaged for connecting the valve body to the pipe-line.

Left end of the valve chamber 5a is made narrow and a sleeve 12 is secured thereto. Inner end of the hole of the sleeve 12 is made conical to form valve seat 12a. A check valve 13 of ring form is slidably fitted between an inner surface of the valve chamber 5a and the sleeve 12 and forced to engage with a shoulder 12b of the sleeve 12 by a spring 14 and closes the lateral holes 12c which communicates the valve chamber 5a with the left side port 5'.

A valve member 15 of cylindrical form is slidably fitted within the valve chamber 5a with sealing members 16, 16 on an outside surface thereof. On the left end of the valve member 15 is provided with a valve head 15a formed conical to conform with the valve seat 12a. And the valve chamber 5a is communicated with the right side port 5" through lateral and lengthwise holes 15c and 15b formed in the valve member 15.

An engaging pin 17 is secured to the valve member 15. The pin 17 fits slidably within the slit 11 and projecting out from the valve body 5 to engage with nuts 8 and 8' with its end being fitted within a groove 8a of the nut 8. So that the valve member 15 can be moved by turning the nut 8 and 8', i.e., the valve member 15 can be moved rightward by turning the nut 8, and it can be moved leftward by turning the nut 8', thus the valve clearance between the valve seat 12a and valve head 15a can be adjusted by turning the nuts 8 and 8'.

After the adjustment is finished, the valve member 15 can be locked by tightening the nuts 8 and 8' together. Therefore, in case the fluid is introduced into the right side port 5", it flows into left portion of the valve chamber 5a through holes 15b and 15c, then moves the check valve 13 against spring 14 and flows out through holes 12c and port 5' as a free flow. On the other hand, if the fluid is introduced into the leftside port 5', the fluid passes through the clearance between valve head 15a and valve seat 12a and the flow rate is adjusted by turning the nuts 8 and 8', and flows out through the valve chamber 5a, holes 15c and 15b, and right side port 5" as a controlled flow.

FIG. 3 shows another embodiment of the flow regulating valve according to the present invention. In this case, a valve member 15 which is slidably fitted within the valve chamber 5a has an enlarged bore at the left end and this enlarged bore is slidably fitted with the inner end of the sleeve 12 which is fixed to the left end of the valve body 5. A helical groove 18 is formed about the fitting area of the sleeve end to form a flow passage of small sectional area, so that fine adjustment of the flow rate can be made by moving the valve member 15 and adjusting the depth of fitting of the sleeve end within the bore of the valve member 15. As for instance, if the valve member is moved to the left, the flow rate decreases because of increase of flow resistance of the groove 18, and in case the valve member is moved to the right, the flow rate increases because of decrease of flow resistance of the groove 18. The groove may be provided on the inner surface of the hole of the valve member instead of sleeve end. And in this embodiment, the connecting pin 17 is held within the groove 8a' of adjusting nut 8 by attaching a retaining plate 20 to the end surface of the nut 8, so that the valve member 15 can be moved only by turning the nut 8, and the nut 8' is used as a lock nut.

A check valve 13 is fitted within the hole of the sleeve 12 and forced to engage with the inner shoulder of the sleeve by the spring 14 to close the flow passage, and lateral holes 12d are provided on the wall of the sleeve 12 to communicate the left side port 5' with the valve chamber 5a. 19 is a spring retaining rod provided within the sleeve. Other constructions are almost the same as the first embodiment of this invention.

Therefore, in case the fluid is introduced into the right side port 5", it flows through the lengthwise hole 15b and moves the check valve 13 against spring 14 and flows out through the left side port 5' as a free flow.

And in case the fluid is introduced into the left side port 5', it flows through holes 12d, valve chamber 5a and the groove 18 of the flow restricting means, thereby the flow rate is adjusted by turning the nut 8, and flows out through the hole 15b and port 5" as a controlled flow.

FIG. 4 shows a further embodiment of the flow regulating valve according to the present invention. In this case, the the left end portion of the axial bore in valve member 15 engages slidably with sleeve 12 to provide flow restricting means, and the sleeve 12 has a stem portion 12d extended toward the right through the bore of the valve member 15 and fixed between the left inner shoulder of the valve body 5 and the connecting head 9. The check valve 13 is forced to engage with the left end of the sleeve 12 by the spring 14 and close the flow passage.

An annular groove 23 is formed on the outer surface of the valve member 15 and a steel ball 17' is fitted therein. The ball 17' is fitted slidably within the slit 11, then projecting out therethrough, and fitted within an annular groove 8a" formed on an inner surface of the adjusting nut 8. A lengthwise groove 24 is provided for accomodating the ball 17' within the groove 8a". For inserting the ball 17', the nut 8 is moved to about the right end of the slit 11 and the groove 24 is brought into alignment with the slit 11, then the ball 17' which is fitted within the groove 23 of the valve member 15 is pushed into groove 8a" through groove 24. The valve member 15 is also moved together. Thus the ball 17' is fitted within the groove 8a" and the valve member 15 can be moved by turning the nut 8.

The function of this flow regulating valve is similar to those of the above embodiments, i.e., in case the fluid is introduced into the port 5", it flows through hole of the sleeve 12 and moves the check valve 13, then flows out through the port 5' as a free flow. In case the fluid is introduced into the port 5', it flows through a gap 22 between the valve body 5 and check valve 13, a gap 25 between the valve body and sleeve and the groove 18 of the flow restricting means, thereby the flow rate is adjusted by turning the nut 8 and flows out through lateral holes 26 provided on the sleeve 12, and the port 5" as a controlled flow.

The slit 11 can be slanted slightly for turning the valve member 15 while regulating the flow rate.

As mentioned above, the flow regulating valve of the present invention can be constructed in a straight and very compact form and the fine adjustment of the flow rate can be attained, as the nut engaged with the outside surface of the valve body is used for the adjustment instead of the valve stem of the conventional type, which is projecting out from the body, and the adjustment is made with the thread of comparatively large diameter.

What is claimed is:

1. A flow regulating valve comprising an elongate cylindrical valve body having an axial bore with ports at opposite ends opening into said bore, means for connecting opposite ends of said valve body respectively to fluid flow lines,
   - a valve member axially slidable in said axial bore of said valve body and having an axial bore,
   - a sleeve fixed in said axial bore of said valve body and having a portion slidably received in an end portion of said axial bore of said valve member and grooved with a helical groove, said sleeve further having an axial bore surrounded by an annular check valve seat,
   - a check valve member seatable on said check valve seat and a spring acting on said check valve member to bias said check valve member to seat on said check valve seat and thereby close said axial bore of said sleeve to flow of fluid through said axial bore of said sleeve in one direction while permitting flow of fluid in the opposite direction, means providing a flow path bypassing a check valve comprising said check valve seat and said check valve member, and including in said flow path said helical groove of said grooved portion of said sleeve, and means for moving said valve member axially of said valve body and positioning it to embrace and thereby cover a selected portion of said helically groove portion of said sleeve so as to vary the flow resistance of said helical groove, whereby said flow regulating valve permits free flow of fluid in a direction to open said check valve and regulates flow of fluid in the opposite direction by the position of said valve body relative to said sleeve.

2. A regulating valve according to claim 1, in which said sleeve has a hollow stem portion which extends through said axial bore of said valve member and has an end secured to said valve body adjacent one end of said valve member while said grooved portion of said sleeve is received in said axial bore of said valve member adjacent the opposite end of said valve member.

3. A regulating valve according to claim 2, in which said stem portion of said sleeve has at least one axial opening therethrough between said grooved portion of said sleeve and a zone of attachment of said stem portion to said valve body.

4. A regulating valve according to claim 3, in which said check valve seat is at an end of said sleeve opposite the end of said stem portion secured to said valve body, said check valve member and spring being in a portion of the axial bore of said valve body.

5. A regulating valve according to claim 1, in which said valve body has an intermediate externally threaded portion surrounding said valve body with an axially extending slot in said threaded portion, and in which said means for moving said valve member axially comprises an internally threaded nut on said intermediate externally threaded portion of said valve body and a ball received in an annular internal groove in said nut and in a recess in said valve body, whereby rotation of said nut moves said valve member axially of said valve body.

6. A regulating valve according to claim 1, in which said axial bore of said valve body has an enlarged end portion, said helically grooved portion of said sleeve being slidably received in said enlarged end portion of the axial bore of said valve body.

7. A regulating valve according to claim 6, in which said axial bore of said sleeve has an enlarge portion in which said check valve member and spring are accommodated, said check valve seat comprising an annular shoulder between said enlarged portion of said axial bore of said sleeve and an adjacent smaller portion of said axial bore of said sleeve.

8. A regulating valve according to claim 7, in which said bypass flow path comprises a radial opening in said sleeve into said enlarged bore portion and an annular space between said sleeve and said vavlve body.

9. A regulating valve according to claim 1, in which said valve body has an intermediate externally threaded portion surrounding said valve body with an axially extending slot in said threaded portions, and in which said means for moving said valve member axially comprises a pin on said valve member extending out through said slot, a first internally threaded nut screwed on said threaded portion of said valve body and having in an end face thereof an annular recess receiving an outer end portion of said pin, a second internally threaded nut screwed on said threaded portion of said valve body adjacent said end face of said first nut and an annular retaining plate between said nuts.

* * * * *